UNITED STATES PATENT OFFICE 2,154,186

WATER-SOLUBLE AZO DYESTUFFS

Hugo Schweitzer, Leverkusen-Wiesdorf, Otto Bayer, Leverkusen I. G.-Werk, and Gerhard Schrader, Opladen, Germany, assignors to General Aniline Works, Inc., New York, N. Y., a corporation of Delaware No Drawing. Application June 5, 1936, Serial No. 83,792. In Germany June 29, 1935

3 Claims. (Cl. 260—163)

The present invention relates to new water-soluble azo dyestuffs, more particularly it relates to azo dyestuffs which are characterized by containing in a diazotization component a sulfofluoride group ($SO_2F$) and which are constituted in such a manner that at least one sulfonic acid group is present in the dyestuff molecule.

Our new dyestuffs which may be represented by the following general formula:

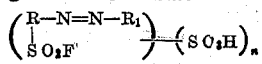

wherein R stands for an aromatic radical, $R_1$ stands for the radical of an azo dyestuff coupling component and $n$ stands for a whole number, are obtainable by diazotizing an aminoaryl-sulfofluoride and coupling with one of the usual coupling components generally used in the manufacture of azo dyestuffs, for example: pyrazolone sulfonic acids, hydroxy and aminonaphthalene sulfonic acids, aminonaphthol sulfonic acids, their acyl derivatives, and others; thereby the components are selected in such a manner that at least one sulfonic acid group is present in the dyestuff molecule.

Our new dyestuffs are in form of their alkali metal salts watersoluble powders yielding, depending upon the specific components used in their manufacture, on animal fibers, such as wool, various shades. The shades obtained are in general very clear and of good fastness to light, and particularly they are distinguished in many cases, besides their being even, by good fastness to washing.

The invention is illustrated by the following examples, but is not restricted thereto.

Example 1

17.5 grams of 3-aminobenzenesulfofluoride (melting point 30° C., manufactured from 3-aminobenzene-1-sulfonic acid by means of fluorosulfonic acid) are diazotized in the usual manner, in the presence of hydrochloric acid, with 6.9 grams of sodium nitrite. The diazo solution is purified from small impurities and added to a solution of 25 grams of 1-(4'-sulfophenyl)-3-methyl-5-pyrazolone and 52 grams of crystallized sodium acetate in 1 liter of water.

After coupling is complete, the dyestuff, having in its free state the following formula:

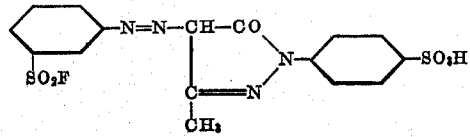

is worked up according to known methods. It dyes wool even yellow shades of good fastness to light and washing.

Example 2

17.5 grams of 3-aminobenzene-1-sulfofluoride are diazotized as described in Example 1. Then the diazo solution is added to a solution of 22.4 grams of 2-naphthol-6-sulfonic acid in sodium bicarbonate. When coupling is complete, the dyestuff, having in its free state the following formula:

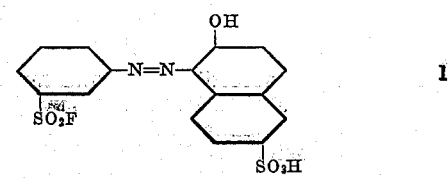

is worked up according to known methods.

It dyes wool even orange shades, which are fast to washing and to light.

On replacing the 2-naphthol-6-sulfonic acid by an equivalent quantity of 1-acetylamino-8-naphthol-4.6-disulfonic acid, there is obtained a dyestuff dyeing red shades of similar properties.

Example 3

17.5 grams of 2-aminobenzene-1-sulfofluoride (melting point 67° C., manufactured from 2-aminobenzene-1-sulfonic acid by means of fluorosulfonic acid) are diazotized as indicated in Example 1. The diazo compound is added to a solution of 28.8 grams of 1-(2'-chloro-5'-sulfo)-3-methyl-5-pyrazolone and 52 grams of crystallized sodium acetate, and, after coupling is complete, the dyestuff, having in its free state the following formula:

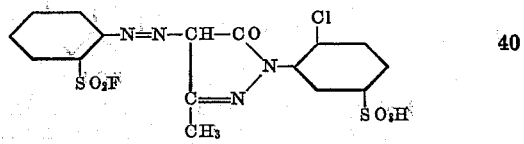

is worked up according to known methods.

It dyes wool even greenish yellow shades, which are fast to light and to washing.

Example 4

20.3 grams of 2-amino-3.5-dimethylbenzene-1-sulfofluoride (melting point 105° C., manufactured from 2-amino-3.5-dimethylbenzene-1-sulfonic acid by means of fluorosulfonic acid) are dissolved in glacial acetic acid, 40 grams of crude hydrochloric acid are added thereto as well as some ice, and diazotization is effected as usual. The diazo compound is added to a solution of 28.1 grams of 2-acetylamino-8-naphthol-6-sulfonic acid in 1 liter of water and 52 grams of crystallized sodium acetate. After coupling is complete, the dyestuff, having in its free state the following formula:

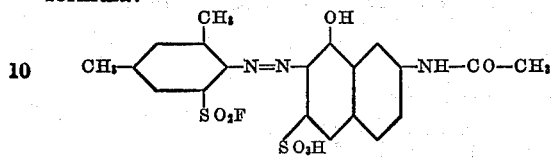

is worked up according to known methods.

It dyes wool even red shades, which are fast to washing and to light.

Example 5

20.3 grams of 2.4-dimethyl-5-aminobenzene-1-sulfofluoride (melting point 92° C., manufactured from 2.4-dimethyl-5-aminobenzene-1-sulfonic acid by means of fluorosulfonic acid) are diazotized as indicated in Example 4. The diazo compound is added to an ice cold solution of 1-(2'-sulfophenyl)-3-methyl-5-pyrazolone. After coupling is complete, the dyestuff, having in its free state the following formula:

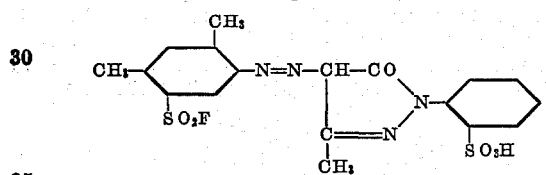

is worked up according to known methods.

It dyes wool even greenish yellow shades, which are fast to washing and to light.

On replacing 1-(2'-sulfophenyl)-3-methyl-5-pyrazolone by 1-(3'-sulfophenyl)-3-methyl-5-pyrazolone or by 1-(4'-sulfophenyl)-3-methyl-5-pyrazolone, dyestuffs of similar properties are obtained.

Example 6

18.9 grams of 2-methyl-4-aminobenzene-1-sulfofluoride (melting point 65° C., manufactured from 2-methyl-4-amino-benzene-1-sulfonic acid by means of fluorosulfonic acid) are diazotized with sodium nitrite and hydrochloric acid as indicated in Example 1. The diazo compound is added to an ice cold solution of 22.4 grams of 1-naphthol-4-sulfonic acid, in the presence of sodium acetate, and, after coupling is complete, the dyestuff, having in its free state the following formula:

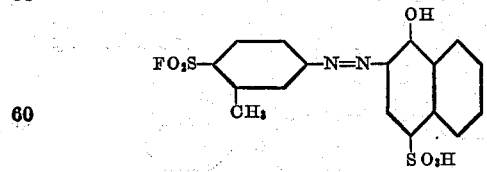

is worked up according to known methods.

It dyes wool even red shades, which are fast to washing and to light.

On replacing the 1-naphthol-4-sulfonic acid by the 3-methyl-5-pyrazolones from o, m or p-sulfanilic acid or from 2-chloraniline-5-sulfonic acid, yellow dyestuffs with similar good properties are obtained.

On replacing the 1-naphthol-4-sulfonic acid by the 2-acetylamino-8-naphthol-6-sulfonic acid, there is obtained a dyestuff dyeing even red shades, which are fast to washing and to light.

Example 7

18.9 grams of 2-methyl-5-aminobenzene-1-sulfofluoride are diazotized as indicated in Example 6. Then the diazo compound is added to an ice cold solution of 23.7 grams of N-methyl-2-naphthylamine-7-sulfonic acid in the presence of excess sodium acetate. After coupling is complete, the dyestuff, having in its free state the following formula:

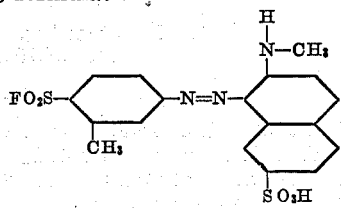

is worked up according to known methods.

It dyes wool even yellowish red shades, which have also good fastness to washing and light.

We claim:

1. Watersoluble mono-azo dyestuffs of the general formula:

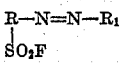

wherein R stands for a member of the group consisting of phenyl and alkyl substituted phenyl and R₁ stands for a member selected from the group consisting of 2-hydroxy naphthalene-6-sulfonic acid and coupling components containing at least one sulfonic acid group of the alkyl aminonaphthol, acyl aminonaphthol and pyrazolone series, which dyestuffs yield on animal fibers in general clear shades of good fastness to light.

2. The dyestuff having in its free state the following formula:

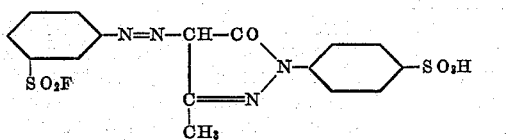

yielding on wool even yellow shades of good fastness to light and washing.

3. The dyestuff having in its free state the following formula:

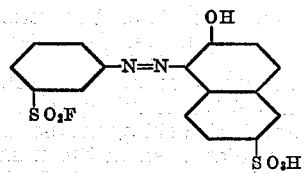

yielding on wool even orange shades which are fast to washing and to light.

HUGO SCHWEITZER.
OTTO BAYER.
GERHARD SCHRADER.